United States Patent
Chida et al.

(10) Patent No.: US 6,944,275 B2
(45) Date of Patent: Sep. 13, 2005

(54) VERSATILE COMMUNICATION DEVICE WITH A FACSIMILE FUNCTION AND A TELEPHONE FUNCTION

(75) Inventors: Susumu Chida, Ichinomiya (JP); Junji Hatamura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 946 days.

(21) Appl. No.: 09/800,732

(22) Filed: Mar. 8, 2001

(65) Prior Publication Data

US 2001/0021040 A1 Sep. 13, 2001

(30) Foreign Application Priority Data

Mar. 8, 2000 (JP) .................................. 2000-063746
Mar. 30, 2000 (JP) .................................. 2000-093382

(51) Int. Cl.$^7$ .............................................. H04M 11/00
(52) U.S. Cl. ............................ 379/100.06; 379/100.01; 358/468
(58) Field of Search .................. 379/100.01, 100.05, 379/100.06, 100.14–100.17, 163, 393; 358/400, 405, 407, 409, 434, 435, 438, 439, 468

(56) References Cited

U.S. PATENT DOCUMENTS

| 4,975,944 A | | 12/1990 | Cho |
| 5,877,872 A | * | 3/1999 | Nomura et al. ............. 358/468 |
| 5,909,288 A | * | 6/1999 | Kawamura ............. 379/100.01 |
| 6,654,148 B2 | * | 11/2003 | Nishii ........................ 358/434 |

FOREIGN PATENT DOCUMENTS

| EP | 0 541 087 A1 | 5/1993 | |
| EP | 0 749 230 A1 | 12/1996 | |
| JP | 07307808 A | * 11/1995 | .......... H04M/11/00 |

* cited by examiner

Primary Examiner—Wing Chan
(74) Attorney, Agent, or Firm—Oliff & Berridge, PLC (57) ABSTRACT

In a versatile communication device having a telephone function and a facsimile function, an erroneous detection of an on-hold melody as a control signal, such as a calling tone (CNG) signal, is prevented when the on-hold melody is played during an on-hold period of the telephone, thereby preventing the device from mistakenly switching connection to the facsimile function during the on-hold period. Further, the on-hold melody containing a signal component of the CNG signal or other control signal is prevented from sending to the remote device, so the remote device provided with a facsimile function does not switch to a facsimile mode during the on-hold status of the voice communication.

11 Claims, 9 Drawing Sheets

VERSATILE COMMUNICATION DEVICE WITH A FACSIMILE FUNCTION AND A TELEPHONE FUNCTION

BACKGROUND OF THE INVENTION

1. Field of the Invention

The present invention relates to a telephone device capable of transmitting an on-hold tone to a remote telephone device through a telephone line upon manipulation of an on-hold button. More particularly, the invention relates to a telephone device capable of preventing an on-hold tone played during an on-hold status of the telephone device from being mistakenly detected as a control signal, such as a calling tone (CNG) signal.

2. Description of the Related Art

Conventionally, there has been known a versatile communication device capable of transmitting facsimile data to a remote facsimile device as well as voice communicating with a remote telephone device through a telephone line. The communication devices having a telephone function and a facsimile function can be classified into three types: integral telephone/facsimile types, external attachment types, and parallel connection types. In the integral telephone/facsimile types, a telephone function and a facsimile function are provided in a single device. In the external attachment types, a facsimile device includes an attachment portion for connecting with a separate telephone device. By attaching the telephone device to the facsimile device using the attachment portion, the telephone device becomes connected to a telephone circuit through the facsimile device. In the parallel connection types, a facsimile device and a telephone device use a single telephone line together. When these devices detect the CNG signal, which is a control signal relating to transmission of facsimile data, the connection with the telephone line is changed for facsimile transmission, thus enabling both reception of incoming telephone calls and of facsimile data.

Conventional devices constantly check for reception of control signals such as the above-described CNG signal. Also, the telephone function normally includes a hold feature, wherein a certain melody is played to indicate the on-hold status to the caller. There is a possibility that the on-hold melody can include the same frequency components as the CNG signal or other control signal. For example, the CNG signal has a frequency of 1100 Hz and alternates between an ON condition for 0.5 seconds and an OFF condition for 3.0 seconds. Because the variety of on-hold melodies is ever increasing, it is quite likely that some on-hold melody will include these characteristics of the CNG signal.

If the communication device detects a frequency in an on-hold melody that is the same as the CNG signal or other control signal, then the communication device will mistakenly switch to processes for receiving a facsimile data. There is also a danger that the communication device will be unable to switch out of the facsimile reception mode, even after the on-hold status is released.

SUMMARY OF THE INVENTION

The present invention has been made to solve the aforementioned problems, and accordingly it is an object of the present invention to provide a versatile communication device that prevents mixing of a signal component of a communication control signal, such as a CNG signal, into an on-hold tone to be sent out to a remote device through a telephone line. The communication device also prevents the remote communication device provided with a facsimile function from being mistakenly operated.

Another object of the invention is provide a communication device capable of receiving facsimile data and of also securing a good telephone communication, and capable of preventing erroneous detection of an on-hold melody as the CNG signal or other control signal when the on-hold melody is played during an on-hold period of the telephone, thereby preventing the device from mistakenly switching connection to the facsimile function during the on-hold period so that telephone communication can not be recovered even after the on-hold status is released.

To achieve the above and other objects, there is provided a communication device including a telephone device connectable through a telephone line to a remote telephone device, comprising: an on-hold key that sends an on-hold tone out to the remote telephone device when actuated; determining means for determining whether or not there is a possibility that the on-hold tone might be detected mistakenly as a communication control signal; and alerting means for alerting the possibility when said determining means determines that there is such a possibility. Typically, the communication control signal is a calling tone signal or a busy tone signal According to another aspect of the invention, a communication device including a telephone device connectable through a telephone line to a remote telephone device, comprises: an on-hold key that sends an on-hold tone out to the remote telephone device when actuated; determining means for determining whether or not there is a possibility that the on-hold tone might be detected mistakenly as a communication control signal; and changing means for changing the on-hold tone when said determining means determines that there is such a possibility. The changing means may include editing means for editing the on-hold tone or tone erasing means for erasing a part of the on-hold tone.

According to still another aspect of the invention, a communication device including a telephone device connectable through a telephone line to a remote telephone device, comprises: an on-hold key that sends an on-hold tone out to the remote telephone device when actuated; detecting means for detecting a communication control signal; determining means for applying the on-hold tone to said detecting means and determining whether or not the on-hold tone is detected mistakenly as the communication control signal; and alerting means for alerting the possibility when said determining means determines that the on-hold tone is detected mistakenly as the communication control signal.

According to further aspect of the invention, a communication device including a telephone device connectable through a telephone line to a remote telephone device, comprises: an on-hold key that sends an on-hold tone out to the remote telephone device when actuated; detecting means for detecting a communication control signal; determining means for applying the on-hold tone to said detecting means and determining whether or not the on-hold tone is detected mistakenly as the communication control signal; and changing means for changing the on-hold tone when said determining means determines that the on-hold tone is detected mistakenly as the communication control signal. The changing means may include editing means for editing the on-hold tone or tone erasing means for erasing a part of the on-hold tone.

According to further aspect of the invention, a communication device comprises: a telephone section for a voice communication with a remote telephone device, said telephone section including an on-hold key for entering an instruction to place said telephone section in an on-hold status; a facsimile section for transmitting and receiving facsimile data to and from a remote facsimile device; discriminating means for discriminating a predetermined signal received through the line; determining means for determining whether or not the voice communication established between said telephone section and the remote telephone device is being in the on-hold status; and disabling means for disabling said discriminating means when said determining means determines that the voice communication established therebetween is in the on-hold status.

Indication signal generating means may further be included in the communication device for generating a predetermined indication signal indicative of the on-hold status. The determining means determines that the voice communication established therebetween is in the on-hold status when the predetermined indication signal is detected. The predetermined indication signal can contain a signal component of an on-hold signal repeatedly output in a duration of the on-hold status.

The telephone section and said facsimile section may be housed in a single unit. The predetermined indication signal may be an on-hold indication signal output from said on-hold key at a timing when said on-hold key is depressed. The determining means determines that the voice communication established therebetween is in the on-hold status when the on-hold indication signal is detected.

The telephone section and said facsimile section may be physically separately provided while using the line in common. Typically, the predetermined indication signal is a predetermined on-hold signal repeatedly output from said telephone section in the duration of the on-hold status or another predetermined on-hold signal transmitted through the line from the remote telephone device. The determining means determines that the voice communication established therebetween is in the on-hold status through monitoring the predetermined on-hold signal and the another predetermined on-hold signal.

According to yet another aspect of the invention, a communication device comprises: a telephone section for a voice communication with a remote telephone device, said telephone section including an on-hold key for entering an instruction to place said telephone section in an on-hold status; a facsimile section for transmitting and receiving facsimile data to and from a remote facsimile device; discriminating means for discriminating a predetermined signal received through the line, indication signal generating means for generating a predetermined indication signal indicative of the on-hold status; determining means for determining whether or not the voice communication established between said telephone section and the remote telephone device is being in the on-hold status; and control means for controlling said discriminating means so that said discriminating means discriminates the predetermined signal while canceling a signal component of the predetermined indication signal from the predetermined signal when said determining means determines that the voice communication established therebetween is in the on-hold status.

The predetermined signal discriminated by said discriminating means includes a facsimile control signal for causing said facsimile section to receive the facsimile data.

BRIEF DESCRIPTION OF THE DRAWINGS

The above and other objects, features and advantages of the invention will become more apparent from the following description when taken in conjunction with the accompanying drawings in which preferred embodiments of the invention are shown by way of illustrative examples.

DETAILED DESCRIPTION OF THE PREFERRED EMBODIMENTS

A versatile telephone device according to the invention will be described in detailed while referring to the accompanying drawings. The telephone device embodying the invention is provided with a facsimile function in addition to a telephone function. The telephone device will firstly be described while referring to FIG. 1.

Figure 1:
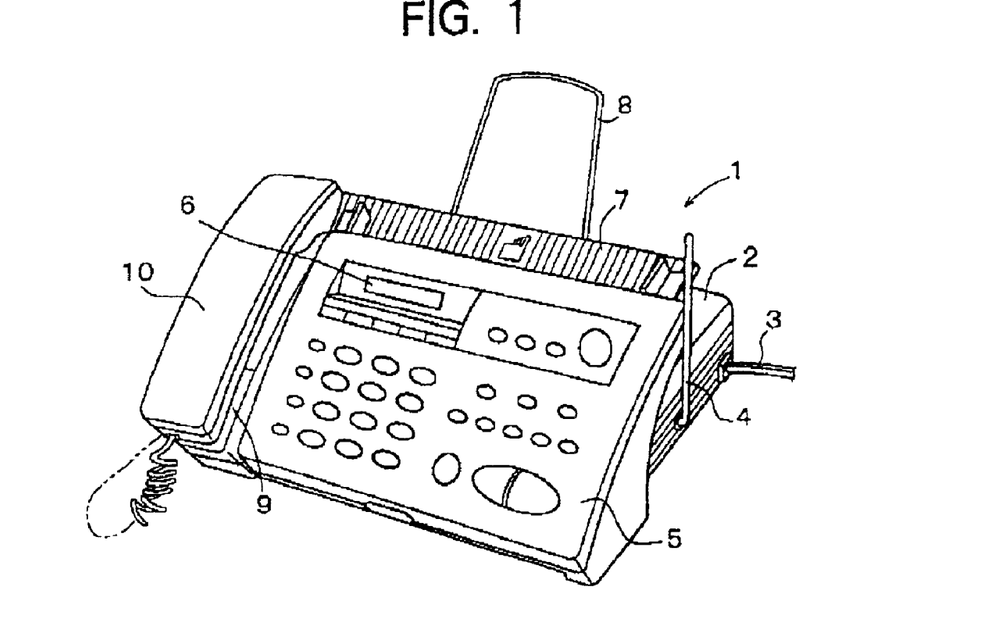
FIG. 1 is a perspective view showing a versatile telephone device according to one embodiment of the invention.

In FIG. 1, the telephone device 1 has a telephone body 2. To the right side of the telephone body 2 are attached a cord 3 and an antenna 4 for communicating with a cordless handset phone (not shown). An operation panel 5 is mounted on the top surface of the telephone body 2. The operation panel 5 includes a liquid crystal display (LCD) 6 and a set of key buttons.

At the rear position of the operation panel 5, a paper stacker 7 is provided for stacking papers. A paper support 8 is attached to the rear position of he paper stacker 7. A handset rest 9 is provided at the left side of the telephone body 2 for placing a handset 10 thereon.

Figure 2:
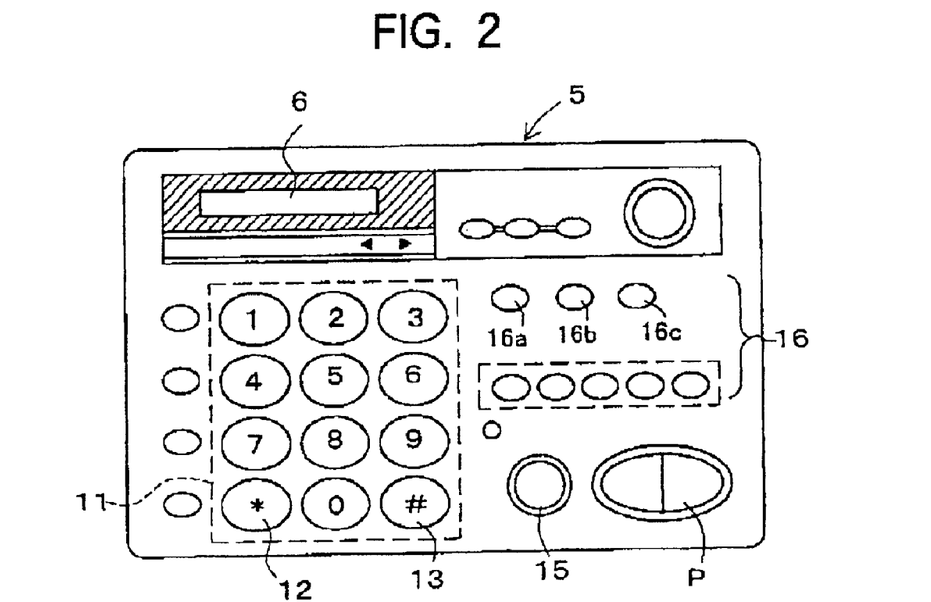
FIG. 2 is a plan view showing an operation panel unit of the versatile telephone device shown in FIG. 1.

Next, a set of key buttons arranged on the operation panel 5 will be described while referring to FIG. 2. As shown in FIG. 2, dial keys 11 are arranged at the left side of the operation panel 5 for dialing. The dial keys 11 include numeral keys, an asterisk key 12, and a sharp key 3. Function buttons 16 are arranged at the right side of the dial keys 11 for selecting a function. At the right lower portion of the operation panel 5, there are arranged a start key P for starting the facsimile transmission and a stop button 15 for stopping the facsimile transmission.

The function buttons 16 include an on-hold tone storing button 16a which is used when a unique melody is stored as an on-hold melody, an on-hold tone play button 16b which is used when the on-hole melody is to be played, and an on-hold button 16c which is used when the on-hold melody is to be sent out to the remote telephone device. The on-hold tone storing button 16a, the on-hold tone play button 16b and the on-hold tone button 16c are collectively referred to as an on-hold member.

Figure 3:
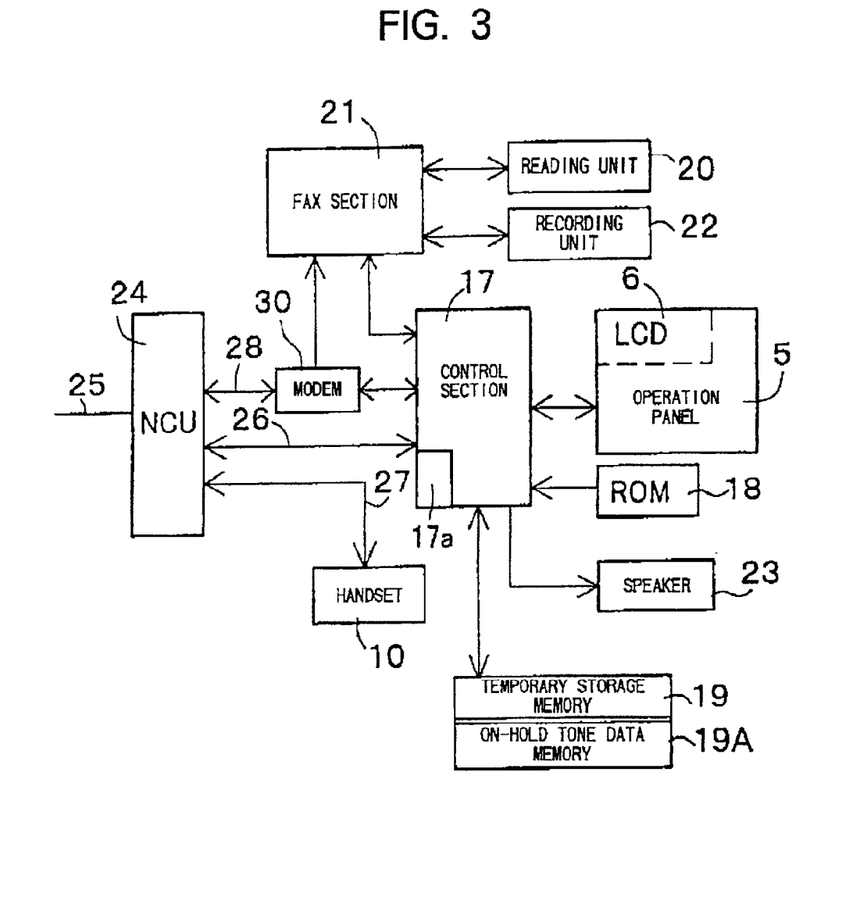
FIG. 3 is a block diagram illustrating an arrangement of a control system of the versatile telephone device shown in FIG. 1.

A control system of the telephone device 1 will next be described while referring to FIG. 3. As shown in FIG. 3, the control system includes a control section 17 having a CPU therein. The control section 17 governs both the telephone section and a facsimile section. To the control section 17 are connected the operation panel 5, a ROM 18, and a temporary storage memory 19, such as a RAM or a flash memory. A speaker 23 for outputting audible sound is further connected to the control section 17. The control section 17 has an audible sound generating functioning portion 17a. By virtue of this functioning portion 17a, music (melody) data stored in the temporary storage memory 19 or an on-hold tone data memory 19A is audibly generated.

The ROM 18 stores various programs including a voice communication control program for implementing a telephone function, function control programs for controlling various functions entered from the operation panel 5, a facsimile transmission/reception control program for implementing document reading and recording operations, basic operation control programs for implementing various kinds of basic operations, such as a switch-over control of a telephone line, and a determination program for determining that the on-hold tone is mistakenly detected as a communication control signal. The temporary storage memory 19 includes the on-hold tone data memory 19A where an on-hold tone to be sent out to a remote telephone through an external line 25 is stored. A modem 30 is further connected to the control section 17 for modulating and demodulating the data for facsimile communication. In cooperation with the modem 30, the control section 17 serves as a detection means for detecting communication control signals. Specifically, the control section 17 detects communication control signals received from the remote device, sends the communication control signals out to the remote device, and detects that the on-hold tone stored in the on-hold tone data memory 19A contains a signal component of the communication control signal, such as CNG signal.

More specifically, the CNG signal has a frequency of 1100 Hz and alternates between an ON condition for 0.5 seconds and an OFF condition for 3.0 seconds. The control section 17 has a detection capability to detect that the modem 30 receives such a frequency component. The modem 30 performs frequency detection of 1100 Hz in a range of 1100 Hz with a small frequency deviation. The control section 17 performs period detection of 0.5 seconds ON condition and 3.0 seconds OFF condition with a small time lag. Therefore, if the on-hold tone contains a frequency component close to that of the CNG signal, the on-hold tone will be mistakenly detected as the CNG signal.

An NCU (Network Control Unit) 24 is connected to the control section 17. The NCU 24 is also connected to the handset 10 by an internal line 27 and to a FAX section 21 by an internal line 28 via the modem 30. The control section 17 can receive the communication control signals entered into the NCU 24 from the external line 25 (telephone line) either via the modem 30 or directly through the internal line 26. Also, the control section 17 can send the communication control signals out to the external line 25 via the NCU 24 either through the internal line 26 or via the modem 30. The external line 25 may be connected, for example, to a homepage of a music (melody) data distributing service company through the Internet. In such a case, the user can obtain a piece of music (melody) through the Internet and use it as the on-line tone.

The control section 17 can control the NCU 24 to output an audible signal received from the external line 25 to the handset 10. Conversely, the audible sound input from the handset 10 is output to the external line 25. The control section 17 can further control the NCU 24 to output image data received from the external line 25 to the FAX section 21 upon demodulating the image data in the modem 30. Conversely, image data read by the FAX section 21 is sent out to the external Line 25 via the NCU 24 upon modulating the image data in the modem 30.

The handset 10 is used for voice communication, and the FAX section 21 is used for transmitting and receiving FAX data. To the FAX section 21 is connected a reading unit 20 in which a scanner (not shown) is provided. The scanner reads characters, symbols or the like on an original document fed into the telephone body 2 from a document stacker 7 and outputs the data thus read to the FAX section 21. A recording unit 22 is further connected to the FAX section 21. The recording unit 22 includes a print head (not shown) for printing the facsimile data received from the remote facsimile device on a recording paper.

When the control section 17 acknowledges receipt of the calling signal from the external line 25, a calling tone is produced. Off-hooking the handset 10 establishes connection between the local telephone and the remote telephone by the NCU 24. To place the communication in an on-hold status, the on-hold button 16c is depressed. The audible sound generating functioning portion 17a of the control section 17 plays the melody stored in the on-hold tone data memory 19A and sends it out to the external line 25 via the internal line 26 to thereby indicate that the telephone device is being in the on-hold status. The on-hold melody being played can be confirmed by the handset 10.

When the communication control signal, such as CNG signal transmitted from the remote facsimile via the external line 25, is detected, the control section 17, which detects the communication control signals in cooperation with the modem 30, controls the NCU 24 and the modem 30 to allow the FAX section 21 to perform the FAX reception. When the facsimile data is later received from the remote facsimile, the image data received at the FAX section 21 is temporarily stored in the temporary storage memory 19 and then recorded on a paper with the recording unit 22. Alternatively, the image data as received is directly recorded with the recording unit 22. In the telephone device 1 with a communication control signal automatic transmission capability, the control section 17 controls the NCU 24 and the modem 30 so that the FAX section 21 starts the FAX transmission upon transmission of the communication control signal. The control section 17 sends the image data to the remote facsimile via the NCU 24 and through the external line.

Figure 4:
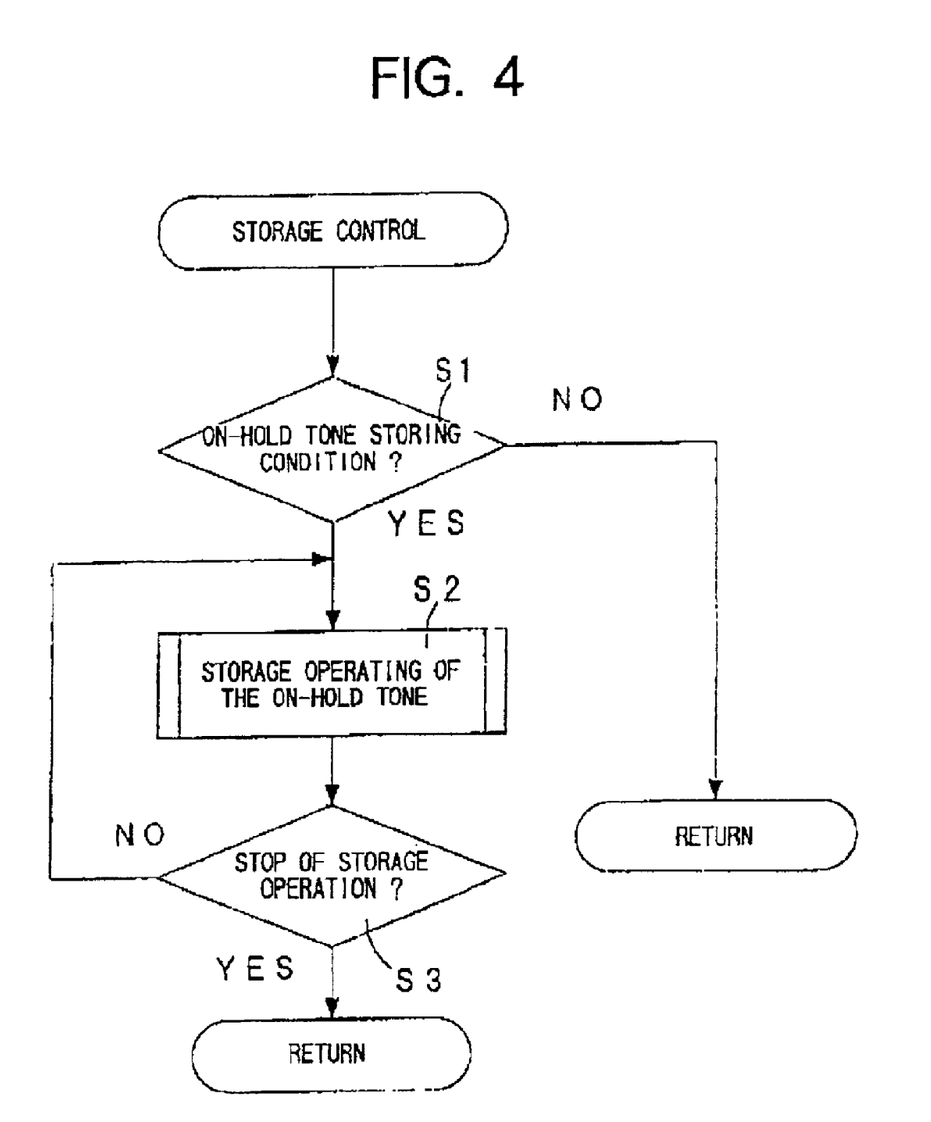
FIG. 4 is a flowchart illustrating an on-hold tone storing process of the versatile telephone device shown in FIG. 1.

Operation for storing new melody so as to be useable as a new on-hold melody will be described while referring to the flowchart of FIG. 4. Before storing the new on-hold melody in the memory 19A, music (melody) data to be used as a basis for the new on-hold memory needs to be prepared or downloaded through the Internet. The music data thus prepared or downloaded is temporarily stored in the memory 19 under the aegis of the control section 17. The music data is in the format of MIDI (Music Instrument Digital Interface) including at least diacritic data and scale data.

In step (hereinafter abbreviated to "S") 1, the control section 17 determines whether or not the telephone device is in an on-hold tone storing condition. An affirmative determination is made when the control section 17 detects the first depression of the on-hold tone storing button 16a. When the button 16a is not depressed, that is, when the device is not in the on-hold tone storing condition (S1: NO), the device is held in a waiting condition.

Conversely, upon establishing the on-hold tone storing condition by the first depression of the button 16a (S1: YES), the control section 17 next performs a storing operation for storing the on-hold tone temporarily stored in the memory 19 into the on-hold tone data memory 19A (S2). Depression of the on-hold tone play button 16b will start playing the music (melody) stored in the memory 19. While listening to the music being played, the user makes the second depression of the button 16a at a desired timing to determine the leading portion of the music to be stored in the memory 19A. Storing the music data in the memory 19A will continue until the user makes the third depression of the button 16a.

The control section 17 determines whether or not the music storing operation is to be stopped (S3). Affirmative determination is made when the control section 17 detects the second depression of the button 16a. When the second depression of the button 16a is made by the user, the telephone device is no longer in the on-hold tone storing circumstance (S1: NO). In this case, the control section 17 returns to the waiting condition. When the second depression of the button 16a is not made, the control section 17 continues the storing operation upon returning to S2.

Figure 5:
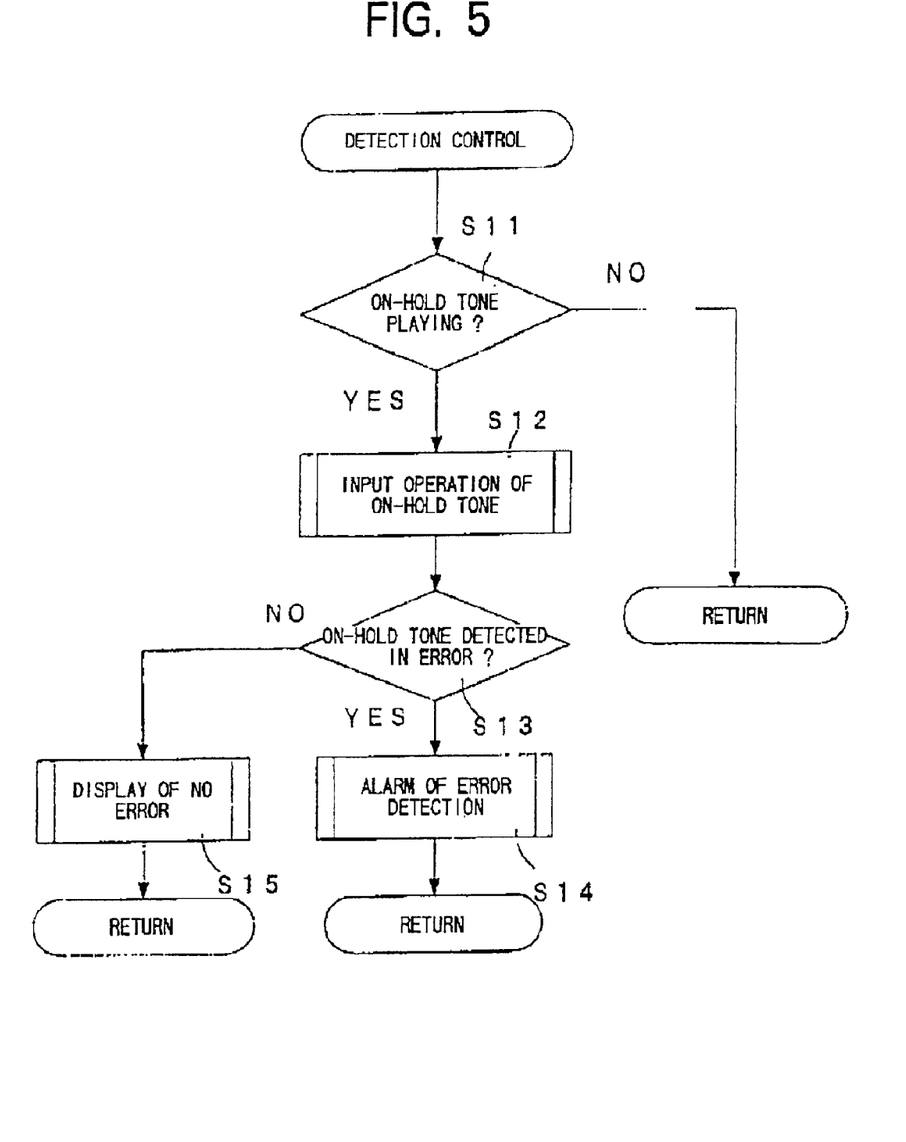
FIG. 5 is a flowchart illustrating a control process according to a first embodiment of the invention.

Next, while referring to FIG. 5, description will be made with respect to detection control of the on-hold tone which control is executed when the melody stored in the memory 19A is used as the on-hold melody.

In S11, the control section 17 determines whether or not the on-hold tone is being played. Affirmative determination is made when the control section 17 detects simultaneous depression of the buttons 16a and 16b. When the on-hold tone is not being played (S11: NO), the control section 17 returns to the waiting condition.

Conversely, when the user depresses both the buttons 16a and 16b, causing the on-hold tone to be played (S11: YES), the control section 17 retrieves the on-hold tone data from the memory 19A and the audible sound generating functioning portion 17a generates an audio signal based on the on-hold tone data. The audio signal is applied to the speaker 23 and the modem 30 (S12). It should be noted that the modem 30 and the control section 17 serve as a determining means which determines whether or not the on-hold tone is mistakenly detected as a communication control signal, such as the CNG signal. Affirmative determination is made when the control section 17 determines that the audio signal applied to the modem 30 is in coincidence with the communication control signal, such as CNG signal.

More specifically, the CNG signal has a frequency of 1100 Hz and alternates between an ON condition for 0.5 seconds and an OFF condition for 3.0 seconds. The modem 30 detects the frequency component of 1100 Hz, and the control section 17 receives this detection signal from the modem 30 and judges the periods of 0.5 seconds ON condition and 3.0 seconds OFF condition. When the signal component of 1100 Hz with 0.5 seconds ON condition and 3.0 seconds OFF condition is mixed with the melody used as the on-hold tone (S13: YES), the control section 17 functions as an alerting means and displays a message on the LCD 6 stating that an error detection of the on-hold tone will occur (S14), whereupon the control section 17 returns to the waiting condition. On the other hand, when the signal component of 1100 Hz with 0.5 seconds ON condition and 3.0 seconds OFF condition is not mixed with the melody (S13: NO), the control section 17 displays a message on the LCD 6 stating that the error detection of the on-hold tone will not occur (S15), whereupon the control section 17 returns to the waiting condition.

The user is notified by the message appearing on the LCD 6 that the on-hold tone to be sent out to the remote telephone device might be mistakenly detected as the communication control signals, such as the CNG signal. This message will urge the user to replace the on-hold tone by executing another storage operation as shown in FIG. 4. If such an interfering on-hold tone is not used, the remote telephone device provided with the facsimile function will not mistakenly switched to a facsimile reception mode. Upon confirming that the on-hold tone will not be mistakenly detected as the communication control signal, the user depresses the on-hold button 16c. Therefore, voice communication can be assured between the local telephone device and the remote telephone device provided with the facsimile function without causing the remote telephone device to erroneously operate.

As described above in detail, the telephone device according to the embodiment of the invention determines a possibility, when both the buttons 16a and 16b are depressed, that the on-hold tone might be mistakenly detected as the communication control signals at the remote side (S13) before sending it to the remote telephone device through the external line 25 by the depression of the button 16c. When there is a possibility that the on-hold tone might be mistakenly detected as the communication control signal, the control section 17 displays an alarm message on the LCD 6. The user can thus recognize the situation, so can suitably replace the on-hold tone with a new one. Accordingly, an error operation which may occur during a voice communication between the local and remote telephone devices can be avoided beforehand.

Figure 6:
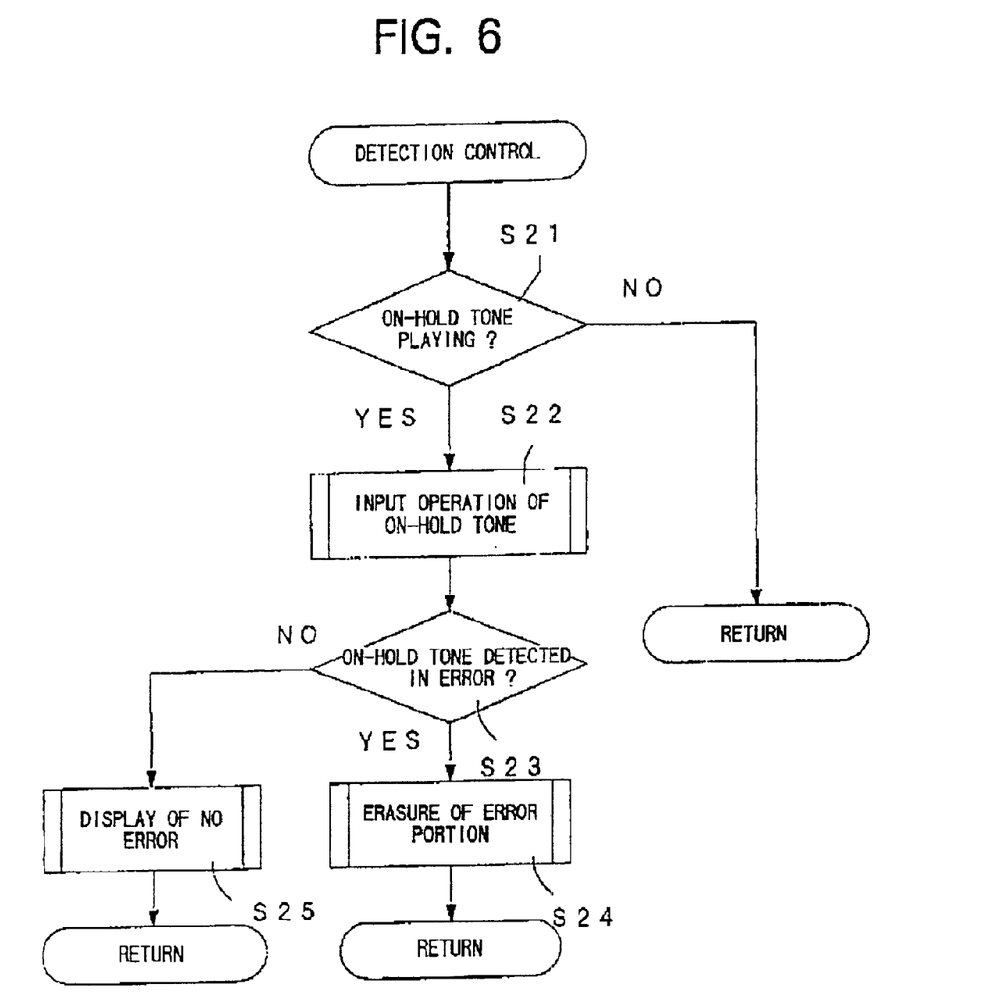
FIG. 6 is a flowchart illustrating a control process according to a second embodiment of the invention.

Next, another on-hold tone detection control according to a second embodiment of the invention will be described with reference to the FIG. 6 flowchart, The mechanical and electrical arrangements of the telephone device 11 according to the second embodiment are as shown in FIGS. 1 through 3, so additional description is not necessary. Also, the on-hold tone storing process described with reference to FIG. 4 is equally applicable to the second embodiment.

In S21, it is determined whether or not the control section 17 is in the on-hold tone playing condition. This determination is made depending upon whether the control section 17 detects simultaneous depression of both the buttons 16a and 16b. When both of the buttons 16a and 16b are not depressed and thus the control section 17 is not in the on-hold tone playing condition (S21: NO), the control section 17 returns to the waiting condition.

Conversely, when the user depresses both buttons 16a and 16b, causing the on-hold tone to be generated (S21: YES), the control section 17 retrieves the on-hold tone data from the memory 19A and the audible sound generating functioning portion 17a generates an audit signal. The resultant audio signal is applied to the speaker 23 and the modem 30 (S22). It should be noted that the modem 30 and the control section 17 serve as a determining means that determines the possibility that the on-hold tone might be mistakenly detected as the communication control signal at the remote telephone device. As described previously, this determination is made based on whether or not the audio signal is in coincidence with a communication control signal.

More specifically, the CNG signal has a frequency of 1100 Hz and alternates between an ON condition for 0.5 seconds and an OFF condition for 3.0 seconds. The modem 30 detects the frequency component of 1100 Hz, and the control section 17 receives the detection signal from the modem 30 and judges the periods of 0.5 seconds ON condition and 3.0 seconds OFF condition.

When the signal component of 1100 Hz with 0.5 seconds ON condition and 3.0 seconds OFF condition is mixed with the melody used as the on-hold tone (S23: YES), the control section 17 functions as a changing means (S24). Specifically, the on-hold tone having a frequency of 1100 Hz with 0.5 second ON condition and subsequent 3 seconds OFF condition is changed, for example, to a revised on-hold tone having a frequency of 1100 Hz with 0.5 seconds ON duration and subsequent 4 seconds OFF condition. That is, no sound duration is extended by 1 second. The control section 17 can extend the no sound duration by 1 second using the diacritic data contained in the MIDI data.

On the other hand, when the signal component of 1100 Hz with 0.5 seconds ON condition and 3.0 seconds OFF condition is not mixed with the melody (S23: NO), the control section 17 does not change the on-hold tone (S25) and returns to the waiting condition.

In this manner, the on-hold tone is monitored and processed so as not to contain the component of the communication control signal to be sent out to the remote telephone device. Thus, a malfunction of the remote telephone device is prevented from occurring.

Figure 7:
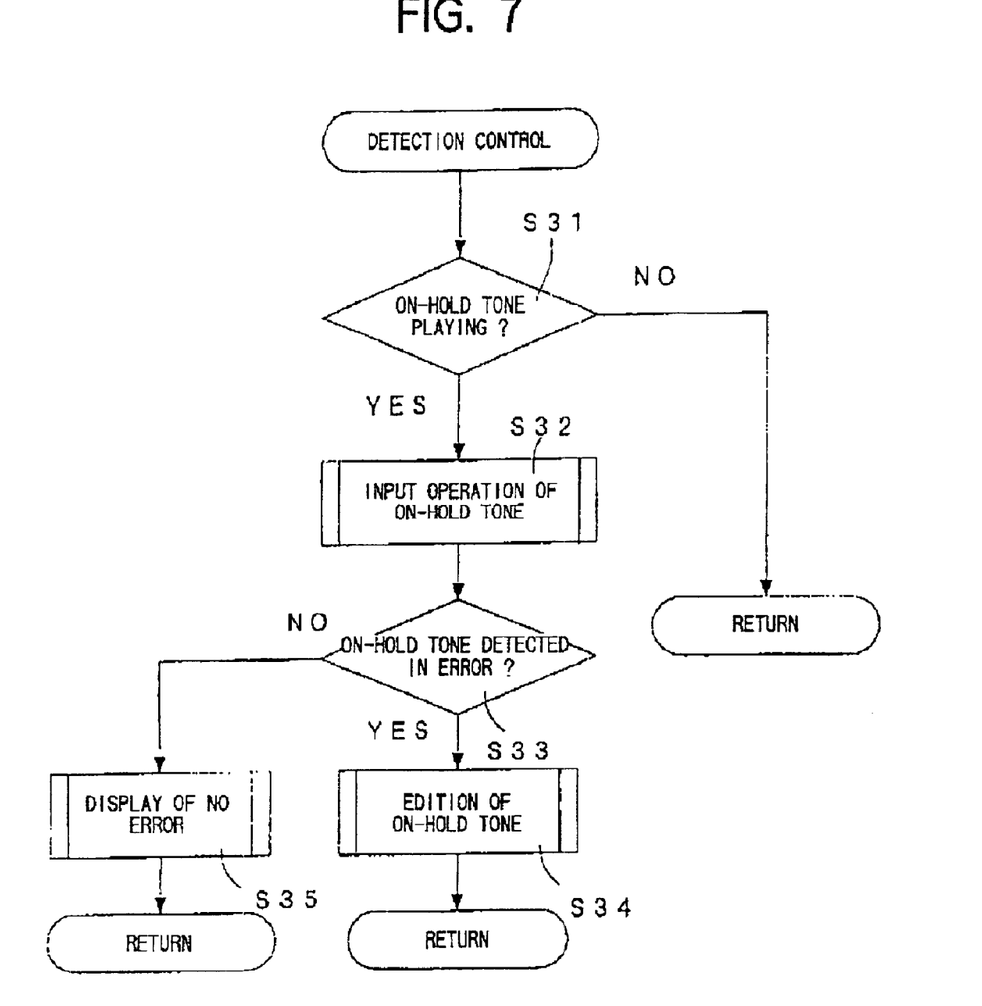
FIG. 7 is a flowchart illustrating a control process according to a third embodiment of the invention.

Next, a further on-hold tone detection control according to a third embodiment of the invention will be described with reference to the FIG. 7 flowchart. The mechanical and electrical arrangements of the telephone device 1 according to the third embodiment are as shown in FIGS. 1 through 3, so additional description is not necessary. Also, the on-hold tone storing process is the same as that of the first embodiment described with reference to FIG. 4.

In S31, it is determined whether or not the control section 17 is in the on-hold tone playing condition. This determination is made depending upon whether the control section 17 detects simultaneous depression of both the buttons 16a and 16b. When both of the buttons 16a and 16b are not depressed and thus the control section 17 is not in the on-hold tone playing condition (S31: NO), the control section 17 returns to the waiting condition.

Conversely, when the user depresses both buttons 16a and 16b, causing the on-hold tone to be played (S31: YES), the control section 17 retrieves the on-hold tone data from the memory 19A and the audible sound generating functioning portion 17a generates an audio signal. The resultant audio signal is applied to the speaker 23 and the modem 30 (S32). It should be noted that the modem 30 and the control section 17 serve as a determining means that determines the possibility that the on-hold tone might be mistakenly detected at the remote telephone device. As described previously, this determination is made based on whether or not the audio signal is in coincidence with the communication control signal.

More specifically, the CNG signal is a signal of 1100 Hz with 0.5 second ON condition and 3.0 seconds OFF condition. The modem 30 detects the frequency component of 1100 Hz, and the control section 17 receives the detection signal from the modem 30 and judges the periods of 0.5 seconds ON condition and 3.0 seconds OFF condition.

When the signal component of 1100 Hz with 0.5 seconds ON condition and 3.0 seconds OFF condition is mixed with the melody used as the on-hold tone (S33: YES), the control section 17 functions as a changing means. The changing means edits the on-hold tone (S34), whereupon the control section 17 returns to the waiting condition. Specifically, the on-hold tone having a frequency of 1100 Hz with 0.5 seconds ON condition and subsequent 3.0 seconds OFF condition is changed, for example, to a revised on-hold tone having a frequency of 800 Hz (the frequency is lowered by 300 Hz) with 0.5 seconds ON condition and subsequent 3.0 seconds OFF condition. The control section 17 can change the frequency of the on-hold tone by changing the scale by one octave using the diacritic data contained in the MIDI data. The original faulty on-hold tone may be changed to another on-hold tone different from the one described above.

On the other hand, when the signal component of 1100 Hz with 0.5 seconds ON condition and 3.0 seconds OFF condition is not mixed with the melody (S33: NO), the control section 17 does not change the on-hold tone (S35), whereupon it returns to the waiting condition.

In this manner, the on-hold tone is monitored so as not to contain the component of the communication control signal to be sent out to the remote telephone device. Thus, a malfunction of the remote telephone device is prevented from occurring.

In the above-described embodiments, detection of the communication control signal component in the on-hold tone may be performed within a memory storing the on-hold tone instead of applying the on-hold tone to the detecting means (modem and the control section). In this modification, the telephone device may not be necessarily provided with a facsimile function. The telephone device may be connected in parallel to the facsimile device. Alternatively, the telephone device may be connected externally of the facsimile device.

The above-described modification in which determination of whether or not an erroneous detection may occur is implemented within the memory is easily applicable to a product (telephone device provided with a facsimile function) that is capable of generating the on-hold tone with the aid of the audible sound generating function of the modem 30.

Determination as to whether or not there is a possibility that the on-hold tone may be mistakenly detected as the communication control signal relies upon the condition in which the remote telephone device detects the communication control signal. Assuming that there is such a product (device) that determines the received signal as the CNG signal when a signal of 1100 Hz is received for a duration of 0.5 seconds t which the signal is ON but before elapse of subsequent 3 seconds at which the signal is OFF, the on-hold tone containing the signal component causing the erroneous detection should of course be picked up.

Whether or not the on-hold tone is in coincidence with a busy tone may be detected. The determination of a possibility that the on-hold tone may be mistakenly detected as the communication control signal may not only be visually alerted by displaying a message on the LCD 6 but also be audibly alerted using melody or buzzer.

In the case where the melody composed by the user is to be used upon storing it in a built-in memory, determination that the on-hold tone is in coincidence with the communication control signal may be made immediately after or before the melody is stored in the memory as the on-hold tone, Determination as to whether or not a signal frequency of a communication control signal is mixed with the melody may be made after the melody composed by the user is completely stored in the memory.

Further, when the user downloads a melody from a homepage of a music data distributing service company through the Internet, a possible erroneous detection of the melody may be checked during downloading or immediately after the entire melody is downloaded into the memory.

The invention is applied not only to the telephone device provided with only the facsimile function but also the telephone device with another functions such as a computer function, calculating function or document editing function.

A fourth embodiment of the invention will be described with reference to the flowchart of FIG. 8. The telephone device as used in the fourth embodiment has such an arrangement that the telephone section and the facsimile section are housed in a single unit as shown in FIG. 3. It should be noted that in the arrangement shown in FIG. 3, the facsimile reception mode can be established by the depression of a push (PB) button when the user acknowledged a facsimile transmission sound from the remote facsimile device when off-hooked. With a device having an automatic control signal detection capability, the control section 17 controls the NCU 24 upon detection of the control signal from the remote facsimile device to place the device in the facsimile reception mode.

Figure 8:
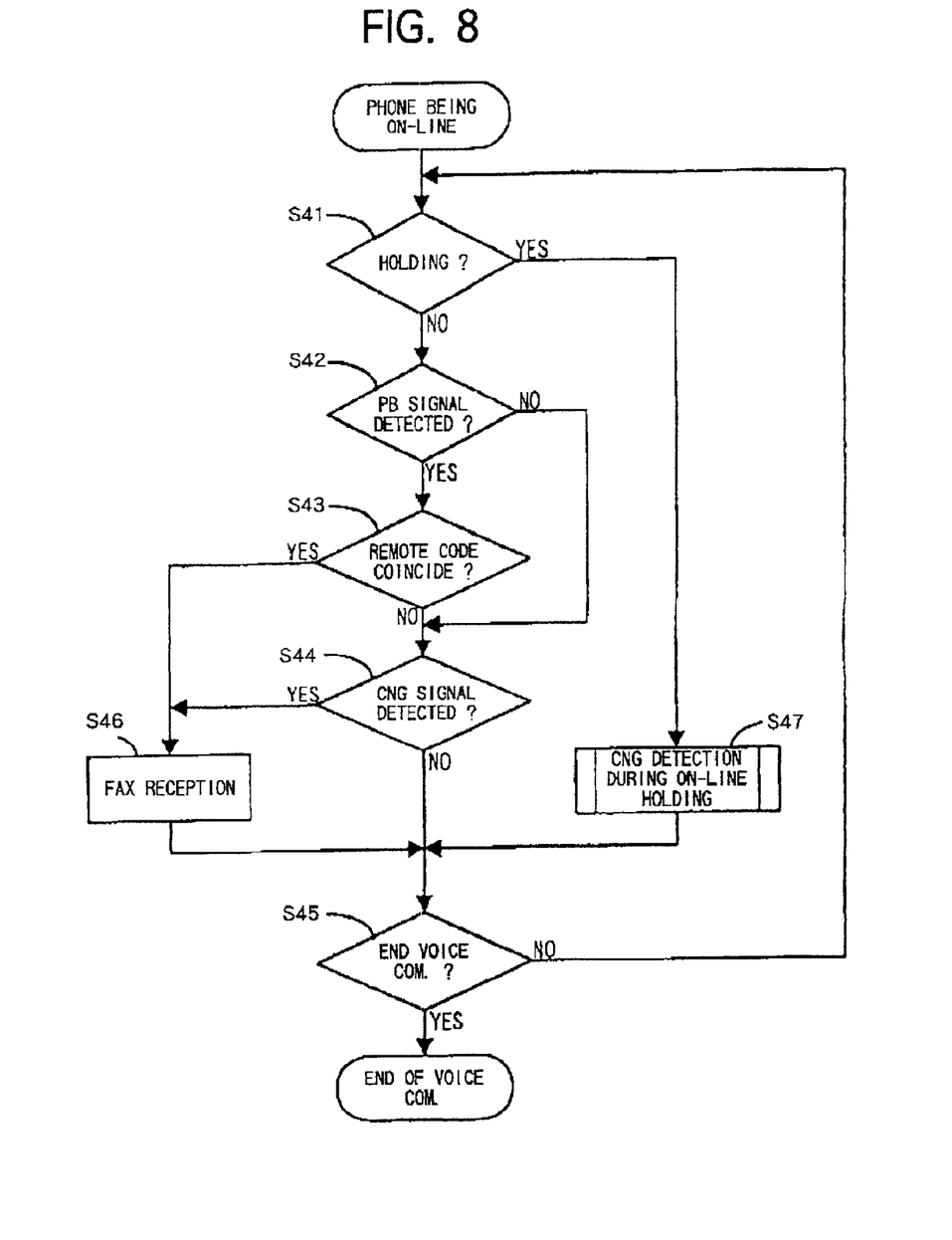
FIG. 8 is a flowchart illustrating a control process according to a fourth embodiment of the invention.

In the flowchart of FIG. 8, after voice communication is established between the local telephone device and the remote telephone device, determination is made as to whether or not the communication is being in the on-hold status. The determination that the communication is in the on-hold status is made when the control section 17 detects a hold instruction signal output attendant to the depression of the on-hold button 16c. When the communication is not in the on-hold status (S41: NO), detection of the PS signal is performed. When the PB signal is detected (S42: YES), it is determined whether or not the detected PB signal is in coincidence with the remote code instructing to receive a facsimile message (S43). When the detected PB signal is in coincidence with the remote code (S43: YES), reception of the facsimile message is carried out (S46). When the PB signal is not detected (S42: NO) or when the detected PB signal is not in coincidence with the remote code (S42: YES, S43: NO), detection of the CNG signal is carried out (S44). When the CNG signal is detected (S44: YES), reception of the facsimile message is carried out (S46). When the CNG signal is not detected (S44: NO) and the communication is to be maintained (S45: NO), the routine returns to S41 whereupon the processes S42 and on are repeatedly executed. When the communication is not to be maintained (S45: YES), the communication is terminated. In this embodiment, only the CN signal is detected in S62, however, both the PB signal and the CNG signal can be detected from the remaining signal as is done in S42 through 44 of the FIG. 8 flowchart to be described later.

On the other hand, when the control section 17 detects that the on-hold button 16c on the operation panel 5 is depressed, determination is made so that the communication is in the on-hold status (S41: YES), and then a CNG signal detection process (S47) is executed.

Figure 10:
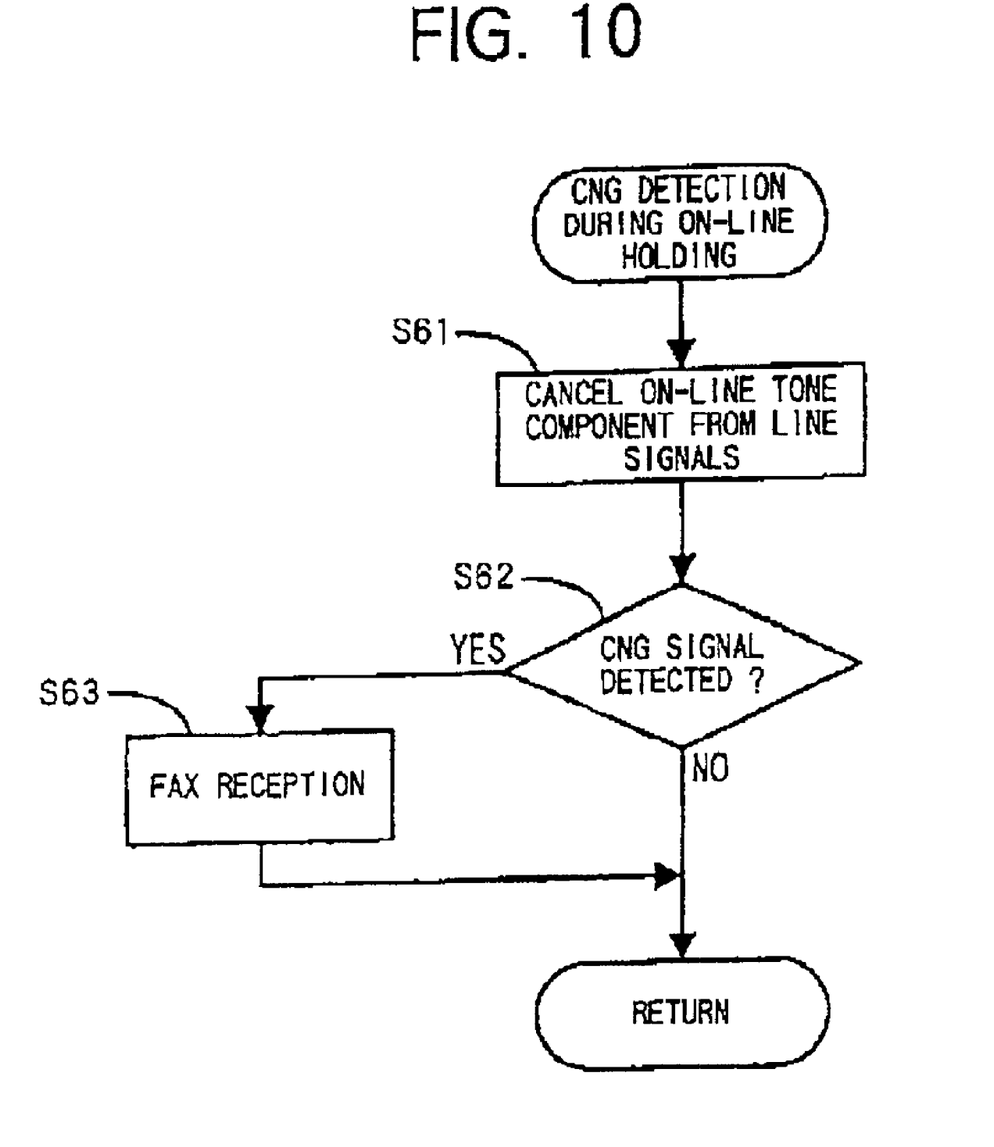
FIG. 10 is a flowchart illustrating a CNG signal detection process executed in the control process according to the fourth embodiment of the invention.

The CNG signal detection process is illustrated in the flowchart of FIG. 10. The incoming and outgoing signals received through and sent out to the external line 25 are stored in the memory 19A and the on-hold tone signal components are canceled from the stored incoming and outgoing signals (S61). The on-hold tone signal represents a melody previously registered as an on-hold tone. Next, it is determined that the CNG signal is detected from the remaining signal components resulting from cancellation of the on-hold tone signal component (S62). When the CNG signal is detected (S62: YES), reception of the facsimile message is carried out (S63). When the CNG signal is not detected (S62: NO), the routine returns to FIG. 8 and executes the communication termination process (S45).

A fifth embodiment of the invention is illustrated in the flowchart of FIG. 8. In the fifth embodiment, the device subject to control is not the one with a telephone function and a facsimile function but a telephone device connected in parallel with a facsimile device or connected to the exterior of the facsimile device. Parallel connection refers to a connection of an independent telephone device directly to the external line 25 without passing through the NCU 24 of the facsimile section. As such, the parallel-connection telephone devices are capable of detecting line signals at all times. External connection refers to a connection of an independent telephone device to the external line through the NCU 24 of the facsimile section. The external connection telephone devices are capable of switching line connection to the external line 25. This can be done by the control section 17 that is responsive to the control signals received from the external line 25. The telephone device to be connected in parallel or externally may not have an arrangement as shown in FIGS. 1 through 3 but any type of telephone devices are available insofar as they have an on-hold tone generating capability.

Figure 9:
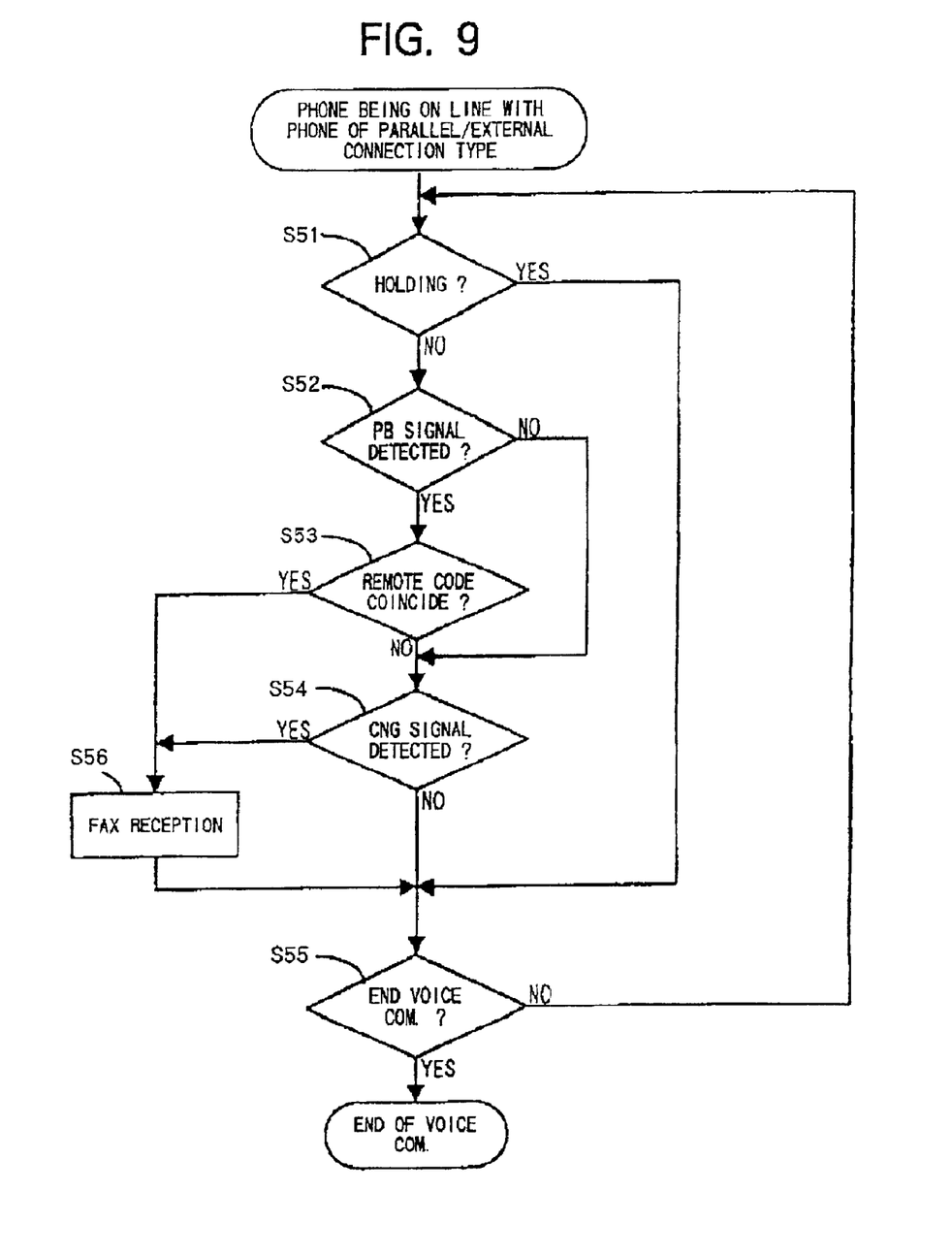
FIG. 9 is a flowchart illustrating a control process according to a fifth embodiment of the invention.

After commencement of the voice communication, determination is made whether or not the communication is being in the on-hold status (S51). Unlike the fourth embodiment, because depression of the on-hold button in the external connection or parallel connection telephone device cannot be detected in the facsimile side, determination of the on-hold status is made based on the on-hold tone sent out to the external line 25. As such, the on-hold tone sent from both the calling side and the called side can be detected. Nevertheless, the facsimile side is unable to identify which side is sending the on-hold tone out to the external line 25. Detection of the on-hold tone is made when a certain signal with a fixed length is repeatedly detected. Specifically, signal segments in between two successive bottom level portions on the line are sequentially stored in the memory 19A. When comparison of the two successive signal segments indicates that they are in coincidence with each other, it is determined that the line signal being continuously output on the line is the on-hold tone, so the line is being in the on-hold status.

When the line is not in the on-hold status (S51: NO), then it is determined that the FB signal is detected (S52). When the PB signal is detected (S52: YES), it is further determined that the detected signal is in coincidence with the remote code (S53) If affirmative (S53: YES), reception of the facsimile message is carried out (S56). When the PB signal is not detected (S52: NO) or when the PE signal is detected (52: YES) but the detected signal is not in coincidence with the remote code (S53: NO), it is determined that the CNG signal is detected (S54). When the CNG signal is detected (S54: YES), reception of the facsimile message is carried out (S56). When the CNG signal is not detected (S54: NO) and the communication is being continued (S55: NO), the routine returns to S51 and the processes in S52 on are repeatedly executed. When the communication is to be terminated (S55: YES), then the communication termination process is executed.

On the other hand, when the control section 17 detects that signal segments in between two successive bottom level portions on the line repeatedly appear on the line, it is determined that the line is in the on-hold status (S51: YES). In this case, detection of the PB signal and the CNG signal is not performed but the routine directly proceeds to S55 where it is determined that the communication is to be terminated. This is because the PB signal and the CNG signal are not transmitted from the remote facsimile device. Further, if the PB signal and the CNG signal from the local facsimile device are detected, an erroneous operation will occur in the local facsimile device. When the communication is to be continued (S55: NO), the routine returns to S51 and the processes in S51 on are repeatedly executed. When the communication is to be terminated (S55; YES), the communication termination process is executed and the process of the routine terminates.

As described in detail, the communication device 1 according to the fourth and fifth embodiments, the melody of the on-hold tone generated during the holding duration will not be mistakenly detected as facsimile control signals, such as CNG signal or other control signals, such as PB signal, FNET signal with a frequency of 1300 Hz Therefore, an erroneous operation, e.g. unintentional reception of the facsimile message, which may occur during the on-hold status can be prevented and a stable voice communication condition can be maintained.

When a voice communication is being performed with the telephone device 1 provided with the facsimile function and the telephone function, the control section 17 can detect the on-hold status of the line. This can be done by detecting depression of the on-hold button 16c. Further, when the user is voice communicating with a remote telephone with the parallel connection or external connection telephone device or when the called person makes the connection in the on-hold status, it is possible to detect that the line is in the on-hold status if the signal on the line 25 is such that the same signal pattern is repeated at a fixed interval. Accordingly, detection of the on-hold tone is assured regardless of the types of the communication device and the voice communication can be maintained.

When the on-hold tone is being sent from the user side, signals sent from the remote communication device can be detected upon cancellation of the on-hold tone frequency component. Therefore, during the on-hold status, the on-hold tone sent from the remote communication device will not be mistakenly detected as the control signals, such as the CNG signal or PB signal. In addition, detection of the CNG signal and the PB signal from the remote communication device is assured, and thus reception of the facsimile message or other control process can be performed even during the on-hold status.

The invention is not limited to the above-described embodiments, but a variety of changes and modifications are. For example, the fourth and fifth embodiments describe using a piece of melody as the on-hold tone. The on-hold status of the parallel connection or external connection telephone device or the on-hold status set by the called side is notified by the melody. However, sending a predetermined control signal preceding the melody enables more simplified and reliable detection of the on-hold status.

With the device having the telephone function and the facsimile into one unit and further having a cordless handset phone, depression of the on-hold button on the cordless handset phone is wirelessly transmitted to the main telephone device, so the detection of the wirelessly transmitted signal tells the on-hold status being set.

What is claimed is:

1. A communication device comprising:
a telephone section for a voice communication with a remote telephone device, said telephone section including an on-hold key for entering an instruction to place said telephone section in an on-hold status;
a facsimile section for transmitting and receiving facsimile data to and from a remote facsimile device;
discriminating means for discriminating a predetermined signal received through the line;
determining means for determining whether or not the voice communication established between said telephone section and the remote telephone device is being in the on-hold status; and
disabling means for disabling said discriminating means when said determining means determines that the voice communication established therebetween is in the on-hold status.

2. The communication device according to claim 1, wherein said telephone section and said facsimile section are housed in a single unit, the predetermined indication signal is an on-hold indication signal output from said on-hold key at a timing when said on-hold key is depressed, and said determining means determines that the voice communication established therebetween is in the on-hold status when the on-hold indication signal is detected.

3. The communication device according to claim 1, wherein said telephone section and said facsimile section are physically separately provided while using the line in common, the predetermined indication signal is any one of a predetermined on-hold signal repeatedly output from said telephone section in the duration of the on-hold status and another predetermined on-hold signal transmitted through the line from the remote telephone device, and said determining means determines that the voice communication established therebetween is in the on-hold status through monitoring the predetermined on-hold signal and the another predetermined on-hold signal.

4. The communication device according to claim 1, wherein the predetermined signal discriminated by said discriminating means includes a facsimile control signal for causing said facsimile section to receive the facsimile data.

5. The communication device according to claim 1, further comprising indication signal generating means for generating a predetermined indication signal indicative of the on-hold status, wherein said determining means determines that the voice communication established therebetween is in the on-hold status when the predetermined indication signal is detected.

6. The communication device according to claim 5, wherein the predetermined indication signal contains a signal component of an on-hold signal repeatedly output in a duration of the on-hold status.

7. The communication device according to claim 1, wherein said telephone section and said facsimile section are housed in a single unit, the predetermined indication signal is an on-hold indication signal output from said on-hold key at a timing when said on-hold key is depressed, and said determining means determines that the voice communication established therebetween is in the on-hold status when the on-hold indication signal is detected.

8. The communication device according to claim 1, wherein said telephone section and said facsimile section are physically separately provided while using the line in common, the predetermined indication signal is any one of a predetermined on-hold signal repeatedly output from said telephone section in the duration of the on-hold status and another predetermined on-hold signal transmitted through the line from the remote telephone device, and said determining means determines that the voice communication established therebetween is in the on-hold status through monitoring the predetermined on-hold signal and the another predetermined on-hold signal.

9. The communication device according to claim 1, wherein the predetermined signal discriminated by said discriminating means includes a facsimile control signal for causing said facsimile section to receive the facsimile data.

10. A communication device comprising:

a telephone section for a voice communication with a remote telephone device, said telephone section including an on-hold key for entering an instruction to place said telephone section in an on-hold status;

a facsimile section for transmitting and receiving facsimile data to and from a remote facsimile device;

discriminating means for discriminating a predetermined signal received through the line;

indication signal generating means for generating a predetermined indication signal indicative of the on-hold status;

determining means for determining whether or not the voice communication established between said telephone section and the remote telephone device is being in the on-hold status; and control means for controlling said discriminating means so that said discriminating means discriminates the predetermined signal while canceling a signal component of the predetermined indication signal from the predetermined signal when said determining means determines that the voice communication established therebetween is in the on-hold status.

11. The communication device according to claim 10, wherein the predetermined signal discriminated by said discriminating means includes a facsimile control signal for causing said facsimile section to receive the facsimile data.

* * * * *